May 2, 1961 D. R. DE BOISBLANC 2,982,910
TEST CIRCUIT
Filed June 5, 1958 3 Sheets-Sheet 1

INVENTOR.
D.R. DE BOISBLANC
BY Hudson & Young
ATTORNEYS

INVENTOR.
D.R. DE BOISBLANC

BY Hudson & Young
ATTORNEYS

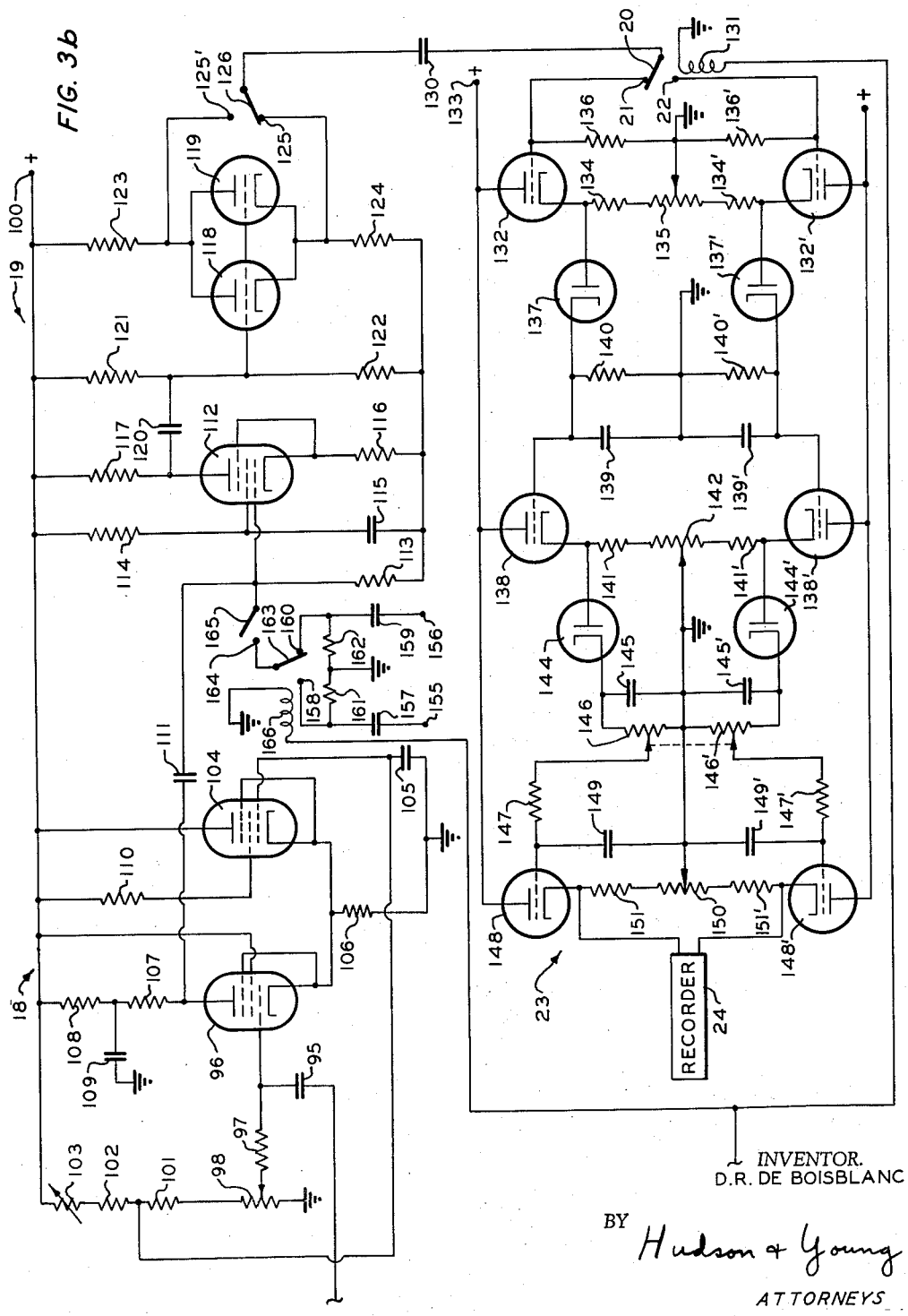

United States Patent Office 2,982,910
Patented May 2, 1961

2,982,910
TEST CIRCUIT
Deslonde R. De Boisblanc, Idaho Falls, Idaho, assignor to Phillips Petroleum Company, a corporation of Delaware
Filed June 5, 1958, Ser. No. 740,065
6 Claims. (Cl. 324—57)

This invention relates to the testing of electrical apparatus such as pulse amplifiers and signal generating means.

Most linear pulse amplifiers which are in general use at this time employ designs conceived several years ago. At the time these amplifiers were designed, the detectors then available were not sufficiently refined to require a gain stability in the amplifier of better than about 0.1 percent. However, at the present time such gain stability is insufficient for certain applications. This requires that some means be available for measuring the gain stability of linear pulse amplifiers in a precise manner. The very nature of the gain instabilities in such amplifiers causes trouble in any device designed to measure the instabilities. Any carefully designed amplifier employs such techniques as negative feedback and temperature control to obtain maximum stability. In order to measure gain of an amplifier, it is desirable to eliminate vacuum tubes to whatever extent possible because these generally are the elements that cause instability.

In accordance with the present invention there is provided a simplified test circuit which is capable of measuring amplifier stability in a precise manner. This circuit utilizes a pulse generator which provides a series of electrical pulses. The pulses are divided so that alternate first pulses are applied to the first input of an adding circuit. Alternate second input pulses are transmitted through an attenuator and the amplifier to be tested to the second input of the adder circuit. The attenuator preferably is adjusted so that the signals are attenuated by approximately the same amount as they are amplified by the test amplifier. The output signals from the adding circuit are transmitted through a discriminator which reduces the amplitude of the signals by a predetermined amount. These signals are again divided so that alternate first pulses are transmitted through a first vacuum tube voltmeter and alternate second pulses are transmitted through a second vacuum tube voltmeter. The outputs of the two voltmeters are compared to provide a measurement of any change in the relative amplitudes of the two groups of pulses. This provides an accurate indication of any change in the amplification provided by the test amplifier.

The apparatus of this invention can also be employed to compare the outputs of two signal generators.

Accordingly, it is an object of this invention to provide apparatus for testing the stability of linear pulse amplifiers.

Another object is to provide apparatus for comparing the outputs of the two signal generators.

Other objects, advantages and features of this invention should become apparent from the following detailed description which is taken in conjunction with the accompanying drawing in which.

Figure 1:
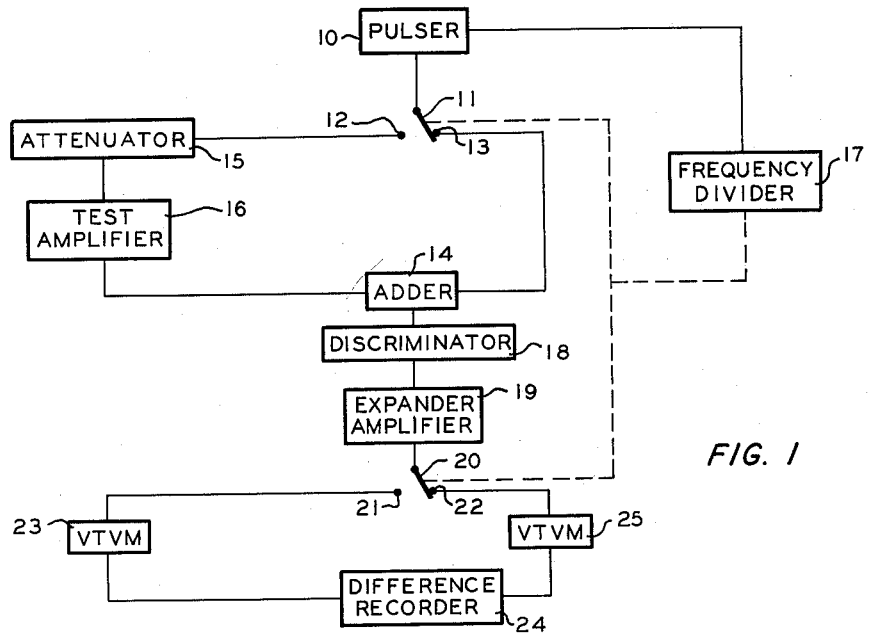
Figure 1 is a schematic block diagram of the test circuit of this invention.
Figure 3A:
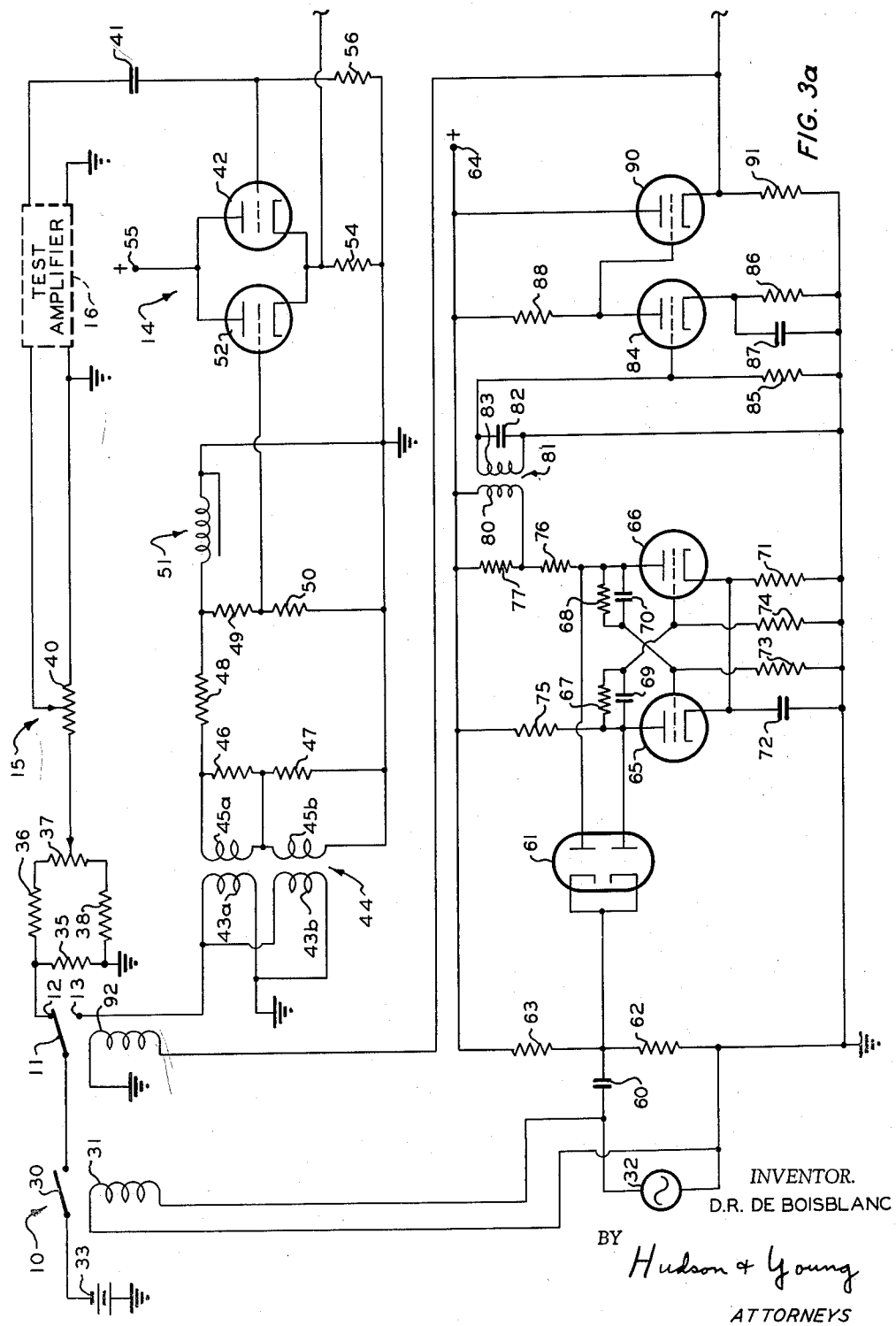

Figures 3a and 3b constitute a detailed schematic circuit drawing of the test circuit of Figure 1.

Referring now to the drawing in detail and to Figure 1 in particular, there is shown a pulser 10 which is adapted to provide a series of electrical pulses at a predetermined frequency. The output of pulser 10 is applied to a switch 11 which is adapted to engage terminals 12 and 13 alternately. Terminal 12 is connected to the first input of an adder circuit 14 through an attenuator 15 and the test amplifier 16. Terminal 13 is connected to the second input of adder 14. An output signal from pulser 10 is also applied to a frequency divider 17 which actuates switch 11 at one-half the frequency of the pulses generated by pulser 10. This results in alternate first pulses being transmitted directly to adder 14 and alternate second pulses being transmitted to the adder through the attenuator and test amplifier. The output of adder 14 is applied through a discriminator 18 and an expander amplifier 19 to a second switch 20 which is adapted to engage terminals 21 and 22 alternately. Terminal 21 is connected through a first vacuum tube voltmeter 23 to the first input of a difference recorder 24. Terminal 22 is connected through a second vacuum tube voltmeter 25 to the second input of recorder 24. Switch 20 is synchronized with switch 11 so as to engage terminals 21 and 22 at the same frequency that switch 11 engages terminals 12 and 13.

Figure 2:
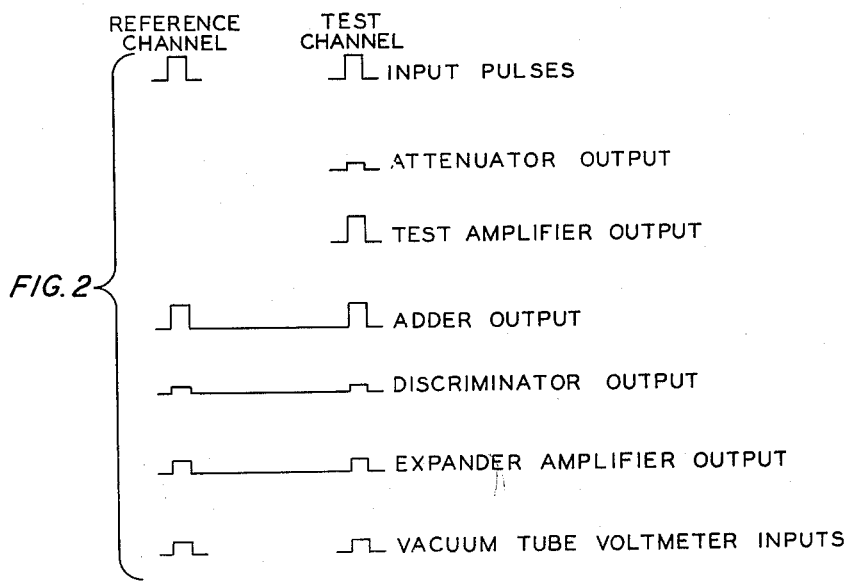
Figure 2 is a graphical representation of the operation of the test circuit of Figure 1.

The operation of the test circuit of Figure 1 can be described in conjunction with the pulses illustrated schematically in Figure 2. The circuit of attenuator 15 and amplifier 16 is designated as the test channel, and the direct connection between terminal 13 and adder 14 is designated as the reference channel. The input pulses to the two channels from pulser 10 are of the same wave form, as shown. The output pulse from attenuator 15 is decreased in amplitude by an amount approximately equal to the amplification factor of the test amplifier. This results in the two output pulses from adder 14 being of substantially the same amplitude. Discriminator 18 reduces the amplitude of these pulses by a predetermined amount. This permits the difference between the amplitudes of the two pulses, if any, to be measured more accurately. Amplifier 19 increases the amplitudes of the two pulses by any convenient amount. The pulses are again divided and transmitted through separate voltmeters. If the gain of amplifier 16 remains constant, the difference between the two voltmeter outputs also remains constant. If the gain of amplifier 16 should change, the difference measured by recorder 24 changes to provide an indication of the instability of test amplifier 16.

In Figures 3a and 3b there is shown a schematic circuit drawing of apparatus which can be employed in the circuit of Figure 1. Pulser 10 is shown schematically as comprising a switch 30 which is opened and closed at a predetermined frequency by means of a coil 31 which is connected across a source of alternating current 32. Switch 30 is connected to ground through a voltage source 33. This switch is closed at the frequency of source 32 to provide a series of electrical pulses which are applied to switch 11. It should be evident, however, that any conventional pulser known in the art can be employed for this purpose.

Terminal 12 is connected to ground through a resistor 35. A circuit comprising a resistor 36, a potentiometer 37 and a resistor 38, which are connected in series relationship, is connected in parallel with resistor 35. The contactor of potentiometer 37 is connected to the first end terminal of a potentiometer 40, the second end terminal of which is connected to ground. The contactor of potentiometer 40 is connected to the first input terminal of test amplifier 16, the second input terminal of which is connected to ground. The first output terminal of amplifier 16 is connected through a capacitor 41 to the control grid of a triode 42 which forms a part of adder circuit 14. The second output terminal of amplifier 16 is connected to ground.

Terminal 13 is connected to ground through the primary windings 43a and 43b of a transformer 44. The first terminal of the secondary winding 45a of transformer 44 is connected to ground through series connected resistors 46 and 47. One terminal of transformer winding 45b is connected directly to ground, and the common terminals of transformer windings 45a and 45b are connected to the junction between resistors 46 and 47. The first terminal of transformer winding 45a is also connected to ground through series connected resistors 48, 49 and 50. A shorted delay line 51 is connected in parallel with series connected resistors 49 and 50. The junction between resistors 49 and 50 is connected to the control grid of a second triode 52 of adder circuit 14. The cathodes of triodes 42 and 52 are connected to ground through a common resistor 54. The anodes of triodes 42 and 52 are connected to a terminal 55 which is maintained at a positive potential. The control grid of triode 42 is connected to ground through a resistor 56.

It should be evident that potentiometers 37 and 40 serve to attenuate the signal applied to the input of amplifier 16 by a predetermined amount. The circuit connected between terminal 13 and triode 52 serves to transmit the second series of pulses to the adder circuit. The delay line 51, which can be a one micro-second delay line, for example, serves to compensate for a delay which may be present in the test amplifier. Attenuator 15 initially is adjusted so that the signals applied to triodes 42 and 52 are of substantially equal amplitudes.

The frequency divider circuit 17 which controls the operation of switches 11 and 20 is illustrated in Figure 3a beneath the circuit thus far described. One terminal of current source 32 is connected through a capacitor 60 to the cathodes of a double diode 61. The cathodes of diode 61 are connected through a resistor 62 to ground and through a resistor 63 to a terminal 64 which is maintained at a positive potential. The second terminal of current source 32 is connected to ground. The anodes of diode 61 are connected directly to the anodes of respective triodes 65 and 66 and through respective resistors 67 and 68 to the control grids of the corresponding triodes. Capacitors 69 and 70 are connected in parallel with respective resistors 67 and 68. The cathodes of triodes 65 and 66 are connected to ground through a resistor 71 which is shunted by a capacitor 72. The control grids of triodes 65 and 66 are connected to ground through respective resistors 73 and 74. The anode of triode 65 is connected to terminal 64 through a resistor 75, and the anode of triode 66 is connected to terminal 64 through series connected resistors 76 and 77.

The primary winding 80 of a transformer 81 is connected in parallel with resistor 77. A capacitor 82 is connected in parallel with the secondary winding 83 of transformer 81. The first terminal of transformer winding 83 is connected to the control grid of a triode 84, and the second terminal of transformer winding 83 is connected to ground. The control grid of triode 84 is connected to ground through a resistor 85. The cathode of triode 84 is connected to ground through a resistor 86 which is shunted by a capacitor 87, and the anode of triode 84 is connected to terminal 64 through a resistor 88. The anode of triode 84 is also connected to the control grid of a triode 90. The anode of triode 90 is connected to terminal 64, and the cathode of triode 90 is connected to ground through a resistor 91. The cathode of triode 90 is also connected through a capacitor 93 to the first terminal of coil 92, the second terminal of which is connected to ground. The pulses applied to coil 92 serve to move switch 11 between terminals 12 and 13 at the frequency of the pulses applied to the coil.

Triodes 65 and 66 and the circuit elements associated therewith constitute a bi-stable multivibrator which has two stable states. This results in output pulses being applied through transformer 81 at a frequency of one-half the frequency of the pulses applied through diode 61 from alternating current source 32. The pulses transmitted through transformer 81 are amplified to actuate coil 92 at a frequency of one-half the frequency at which coil 31 is energized.

The cathodes of triodes 42 and 52, which constitute the output of adder circuit 14, are connected through a capacitor 95, see Figure 3b, to the control grid of a pentode 96. The control grid of pentode 96 is connected through a large resistor 97 to the contactor of a potentiometer 98. One end terminal of potentiometer 98 is connected to ground, and the second end terminal of this potentiometer is connected to a terminal 100, which is maintained at a positive potential, through series connected resistors 101, 102 and 103, the latter being adjustable. The junction between resistors 101 and 102 is connected to the control grid of a second pentode 104. The control grid of pentode 104 is connected to ground through a capacitor 104. The cathodes of pentodes 96 and 104 are connected to ground through a common resistor 106. The anode of pentode 96 is connected to terminal 100 through series connected resistors 107 and 108, the junction therebetween being connected to ground through a capacitor 109. The suppressor grid of pentode 96 is connected to the cathode thereof, and the screen grid is connected to terminal 100. The anode of pentode 104 is connected to terminal 100. The suppressor grid of pentode 104 is connected to the cathode thereof, and the screen grid 104 is connected to terminal 100 through a resistor 110. The anode of pentode 96 is connected through a capacitor 111 to the control grid of a third pentode 112.

The output pulses from adder circuit 14 are applied to the control grid of pentode 96 to control conduction through this pentode. The conduction through pentode 104 is regulated by the bias potential applied to the control grid thereof from the voltage divided network which comprises potentiometer 98 and resistors 101, 102 and 103. The cathodes of pentodes 96 and 104 are connected so that the circuit operates to reduce the amplitudes of the input pulses by a constant predetermined amount. The large resistor 97 between the control grid of pentode 96 and the voltage dividing network stabilizes the circuit.

The output signal from pentode 96 is applied to pentode 112 which forms the first stage of amplifier 19. The control grid of pentode 112 is connected to ground through a resistor 113. The screen grid of pentode 112 is connected to terminal 100 through a resistor 114 and to ground through a capacitor 115. The cathode and suppressor grids of pentode 112 are connected to ground through a resistor 116. The anode of pentode 112 is connected to terminal 100 through a resistor 117 and to the control grids of triodes 118 and 119 through a capacitor 120. The control grids of triodes 118 and 119 are connected to terminal 100 through a resistor 121 and to ground through a resistor 122. The anodes of triodes 118 and 119 are connected to terminal 100 through a resistor 123, and the cathodes of triodes 118 and 119 are connected to ground through a resistor 124. The cathodes of triodes 118 and 119 are connected to a terminal 125 which normally is engaged by a switch 126.

Pentode 112 and triodes 118 and 119 serve to amplify the output pulses from discriminator 18 to establish signals having amplitudes of a preselected value.

Switch 126 is connected through a capacitor 130 to switch 20 which alternately engages terminals 21 and 22 by the action of a coil 131 which is connected in parallel with coil 92 of Figure 3a.

Terminal 21 is connected to the control grid of a triode 132. The anode of triode 132 is connected to a positive potential terminal 133. The cathode of triode 132 is connected to ground through a resistor 134 and the upper section of potentiometer 135, the contactor of which is connected to ground. The control grid of triode 132 is connected to ground through a resistor 136. The cathode of triode 132 is connected to the anode of a diode 137, the cathode of which is connected to the control grid of a triode 138 and to one terminal of a capacitor 139. The second terminal of capacitor 139 is connected to ground. A resistor 140 is connected between the cathode of diode 137 and ground. The anode of triode 138 is connected to terminal 133, and the cathode of triode 138 is connected to ground through a resistor 141 and the upper section of a potentiometer 142. The cathode of triode 138 is connected to the anode of a diode 144, the cathode of which is connected to one terminal of a capacitor 145 and to the first end terminal of a potentiometer 146. The second terminal of capacitor 145 and the second end terminal of potentiometer 146 are connected to ground. The contactor of potentiometer 146 is connected through a resistor 147 to the control grid of a triode 148. The control grid of triode 148 is connected to ground through a capacitor 149. The anode of triode 148 is connected to terminal 133, and the cathode of triode 148 is connected to ground through a resistor 151 and the upper section of a potentiometer 150. The cathode of triode 148 is also connected to the first input terminal of recorder 24.

The circuit between terminal 21 and recorder 24 constitutes vacuum tube voltmeter 23. The input signal is applied through triode 132, which is connected as a cathode follower, and through diode 137 to charge capacitor 139. The voltage on capacitor 139 is similarly applied through triode 138 and diode 144 to charge capacitor 145. This voltage is applied through triode 148 to the first input terminal of recorder 24. It should be evident that this circuit comprises a peak reading voltmeter which measures the peak amplitudes of the pulses applied to terminal 21 by switch 20.

Vacuum tube voltmeter 25 is identical to vacuum tube voltmeter 23 and corresponding parts are designated by like primed reference numerals.

In one specific embodiment of this invention the following circuit components were employed. All resistances are expressed in ohms, all capacitances in microfarads and all potentials in volts.

| Element | Value | Element | Value |
|---|---|---|---|
| 35 | 100 | 106 | 10,000 |
| 36 | 22,000 | 107 | 3,000 |
| 37 | 1,000 | 108 | 510 |
| 38 | 500 | 110 | 100 |
| 40 | 10-100 | 113 | 220,000 |
| 46 | 200 | 114 | 27,000 |
| 47 | 200 | 116 | 600 |
| 48 | 2,200 | 117 | 5,100 |
| 49 | 4,700 | 121 | 1,000,000 |
| 50 | 100,000 | 122 | 1,000,000 |
| 54 | 10,000 | 123 | 9,100 |
| 56 | 100,000 | 124 | 9,100 |
| 62 | 160,000 | 134 | 500 |
| 63 | 90,000 | 135 | 1,000 |
| 71 | 11,000 | 136 | 1,000,000 |
| 73 | 100,000 | 140 | 100,000,000 |
| 74 | 100,000 | 141 | 500 |
| 75 | 22,000 | 142 | 1,000 |
| 76 | 10,000 | 146 | 1,000,000 |
| 77 | 10,000 | 147 | 20,000,000 |
| 67 | 200,000 | 150 | 1,000 |
| 68 | 200,000 | 151 | 3,300 |
| 85 | 51,000 | 41 | 0.01 |
| 86 | 2,200 | 60 | 0.01 |
| 88 | 25,000 | 69 | 0.05 |
| 91 | 6,000 | 70 | 0.05 |
| 97 | 1,000,000 | 72 | 10 |
| 98 | 50,000 | 82 | 6 |
| 101 | 1,000 | 87 | 8 |
| 102 | 68,000 | 93 | 2 |
| 103 | 25,000 | 95 | 0.01 |
| 105 | 0.01 | 42, 52 | 6CG7 |
| 109 | 0.01 | 96 | 6AK6 |
| 15 | 0.01 | 104 | 6AK6 |
| 20 | 0.01 | 112 | 6AK6 |
| 130 | 0.01 | 118, 119 | 12AT7 |
| 139 | 0.1 | 61 | 6AL5 |
| 145 | 1 | 65, 66 | 12AU7 |
| 149 | 1 | 84, 90 | 5687 |
| 55 | 265 | 132, 132′ | 12AU7 |
| 100 | 250 | 137, 137′ | 6AL5 |
| 133 | 250 | 138, 138′ | 12AU7 |
| 64 | 265 | 144, 144′ | 6AL5 |
| 32 | ¹6.3 | 148, 148′ | 12AU7 |

¹ 60 cycles/second.

The apparatus of this invention can also be employed to compare the outputs of two signal generators. The outputs of the instruments to be compared are applied to respective terminals 155 and 156 of Figure 3b. Terminal 155 is connected through a capacitor 157 to a terminal 158, and terminal 156 is connected through a capacitor 159 to a terminal 160. Terminals 158 and 160 are connected to ground through respective resistors 161 and 162. Terminals 158 and 160 are engaged alternatively by a switch 163 which is connected to a terminal 164. Terminal 164 is adapted to be engaged by a switch 165 which is connected to the control grid of pentode 112. A coil 166, which is connected in parallel with coil 131, actuates switch 160 to engage terminals 158 and 160 alternately. When the apparatus is employed to test two signal generators, pulser 10, attenuator 15, amplifier 16, adder 14 and discriminator 18 are not utilized. These circuits can conveniently be removed if desired by a switch, not shown. The output pulses from the two signal generators to be compared are thus amplified alternately and transmitted through respective voltmeters. The two outputs are then compared directly by recorder 24. Switch 126 can engage terminal 125′ if a higher potential output signal is desired.

From the foregoing description is should be evident that there is provided in accordance with this invention, novel testing apparatus which can advantageously be employed to measure the gain stability of linear pulse amplifiers and the like. This circuit can also be employed to compare the outputs of any two signal generators.

While the invention has been described in conjunction with a present preferred embodiment, it should be evident that it is not limited thereto.

What is claimed is:

1. Apparatus for testing the stability of a pulse amplifier comprising means to establish a series of electrical pulses, an attenuator, signal adding means, means to apply alternate first ones of said pulses to the first input of said signal adding means, means to apply alternate second ones of said pulses through said attenuator to the input of an amplifier to be tested, means to apply the output pulses of the amplifier to be tested to the second input of said signal adding means, discriminator means to reduce the amplitudes of signals applied thereto by a predetermined amount, means to apply the output pulses from said adding means to the input of said discriminator means, first and second signal measuring means, means to apply alternate first ones of the pulses from said discriminator means to the input of said first measuring means, means to apply alternate second ones of the pulses from said discriminator means to the input of said second measuring means, and means to compare the outputs of said first and second measuring means.

2. The apparatus of claim 1 further comprising an electrical delay line included in said means to apply alternate first ones of said pulses to the first input of said signal adding means so that a delay can be applied to the transmitted pulses to correspond to any delay in transmission of pulses through the amplifier to be tested.

3. The apparatus of claim 1 further comprising an amplifier having the input thereof connected to the output of said discriminator means to amplify the pulses from said discriminator means before such pulses are applied to said measuring means.

4. The apparatus of claim 1 wherein said measuring means each comprises a vacuum tube voltmeter to provide an output signal representative of the maximum value of the pulses applied thereto.

5. Apparatus for testing the stability of a pulse amplifier comprising means to establish a series of electrical pulses at a first frequency, an attenuator, signal adding means, first switching means to apply said pulses selectively to said attenuator and to the first input of said signal adding means, means to actuate said first switching means at a frequency of one-half said first frequency, means to apply the output pulses from said attenuator through an amplifier to be tested to the second input of said signal adding means, discriminator means to reduce the amplitudes of signals applied thereto by a predetermined amount, means to apply the output pulses from said adding means to the input of said discriminator means, first and second signal measuring means, second switching means to apply the output pulses from said discriminator means selectively to said first and second measuring means, means to actuate said second switching means at a frequency of one-half said first frequency, and means to compare the outputs of said first and second measuring means.

6. Apparatus for testing the stability of a pulse amplifier comprising means to establish a series of electrical pulses, an attenuator, signal adding means, means to apply alternate first ones of said pulses to the first input of said signal adding means, means to apply alternate second ones of said pulses through said attenuator to the input of an amplifier to be tested, means to apply the output pulses of the amplifier to be tested to the second input of said signal adding means, first and second signal measuring means, means to apply alternate first ones of the pulses from said signal adding means to the input of said first measuring means, means to apply alternate second ones of the pulses from said signal adding means to the input of said second measuring means, and means to compare the outputs of said first and second measuring means.

References Cited in the file of this patent

UNITED STATES PATENTS

| | | |
|---|---|---|
| 2,414,477 | Meacham | Jan. 21, 1947 |
| 2,471,530 | Lobel | May 31, 1949 |
| 2,548,276 | Weisbecker | Apr. 10, 1951 |
| 2,755,436 | Heinz | July 17, 1956 |
| 2,929,988 | Engleman | Mar. 22, 1960 |

FOREIGN PATENTS

| | | |
|---|---|---|
| 569,279 | Great Britain | May 16, 1945 |
| 758,994 | Great Britain | Oct. 10, 1956 |
| 769,806 | Great Britain | Mar. 13, 1957 |
| 779,046 | Great Britain | July 17, 1957 |